March 15, 1966 E. M. DEXTER ETAL 3,240,219

FLUID LOGIC COMPONENTS

Filed Nov. 26, 1962

INVENTOR
Edwin M. Dexter
D. Roland Jones
BY Hurvitz & Rose
ATTORNEYS

United States Patent Office 3,240,219
Patented Mar. 15, 1966

3,240,219
FLUID LOGIC COMPONENTS

Edwin M. Dexter, Silver Spring, and Donnie Roland Jones, Hyattsville, Md., assignors to Bowles Engineering Corporation, Silver Spring, Md., a corporation of Maryland Filed Nov. 26, 1962, Ser. No. 240,061
15 Claims. (Cl. 137—81.5)

Figure 1:
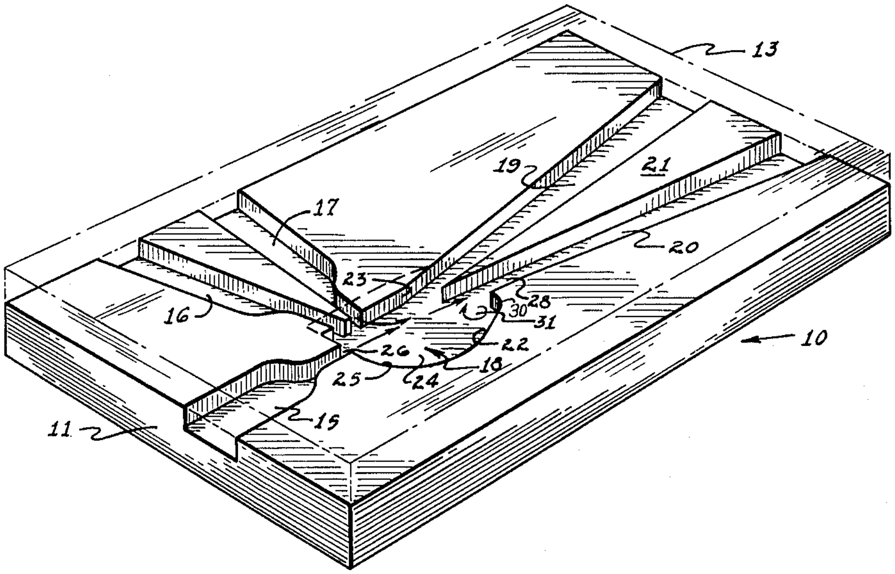

This invention relates generally to pure fluid logic components capable of performing logic functions without moving parts and more specifically to a pure fluid logic component having an automatic reset capability.

Existing electronic logic systems are capable of performing the basic arithmetic functions of addition, subtraction, multiplication and division. The electronic systems typically include circuits that are capable of producing an output signal which is a prescribed function of one or more input signals. Such systems normally employ the binary system of number notation because of the ease of recognition and handling of the quantities employed. Specifically, the binary number system utilizes only two number designations 1 and 0; the 1 normally being represented by a voltage pulse and the 0 normally being represented by the absence of a voltage. By causing the voltage pulse representing a binary 1 to be substantially greater (for instance, 2 volts) than the quiescent voltage level of the system, which represents a binary 0, the circuits of the system may be made to readily distinguish between the two signals generated in the system.

Electronic data handling systems utilizing the binary systems of notation normally employ four basic circuit elements and "and," "or-nor" (also known simply as "or"), "not" logic elements plus flip-flops, or alternatively, the "and" and "or-nor" logic elements are used in combination with inverters and flip-flops.

The present invention is primarily concerned with the AND and OR-NOR functions of logic elements. In electronic binary systems an AND function signifies a type of circuit whereby the output signal has a value of 1 only when input data signals are applied to all of the input circuits of the element.

An OR component serves to indicate that the output value is 1 if any or all of the input data signals have a value of 1. The NOR function of an OR-NOR component refers to the situation or state wherein neither input signal has a value of 1 so that the value of the output is 0, or alternatively, the inverted output signal has a value of 1.

Electronic computers can, of course, speedily perform all types of logic functions. However, in many applications of data handling, high speeds of operation are not required and therefore the high cost of an electronic system is not warranted. While mechanical systems employing liquids and gases have been developed which will perform logic functions essentially analogous to those performed by existing electronic logic elements, such systems require large numbers of moving parts. Moving mechanical parts produce operating limitations because of friction, thermal expansion and wear. Also, mechanical systems are limited in some applications because the weight and inertia of the moving parts impart inherently long response times to such systems and consequently reduce the computing speed below that desired even for relatively low speed systems.

In joining logic components to provide adders, subtractors, multipliers and dividers in any kind of a computer, it is often necessary to stack and otherwise combine the various logic components. When the signal passes through a series of such components, however, there are power losses, causing the amplitude of the output signal to decrease. Thus, in an electronic computer, voltage and current amplification is required in order to perform complex operations.

Similarly, in fluid systems, energy losses resulting from skin effects and stream turbulence reduce the magnitude of the output signal and therefore some mechanism for providing a signal gain should preferably be incorporated in the system. Achieving a power gain in a fluid computer has hitherto required moving parts, however as mentioned above, such parts cause these computers to have relatively slow response times. Thus, there exists a need in the fluid computer art for achieving a signal or power gain without moving parts so that the fluid computer elements may be stacked into complex arrangements and combinations and yet operate with relatively fast response times.

It was discovered recently that a fluid-operated system having no moving parts could be constructed so as to provide a fluid amplifier in which the proportion of the total energy of a fluid stream delivered to an output orifice or utilization device is controlled by a further fluid stream of lesser total energy. These systems are generally referred to as "pure fluid amplifiers," since no moving mechanical parts are required for their operation.

A typical pure fluid amplifier may comprise a main fluid nozzle extending through an end wall of an interaction region defined by a sandwich-type structure consisting of an upper plate and a lower plate which serve to confine fluid flow to a planar flow pattern between the two plates, an end wall, two side walls (hereinafter referred to as the left and right side walls), and one or more dividers disposed at a predetermined distance from the end wall. The leading edges or surfaces of the dividers are disposed relative to the main fluid nozzle centerline so as to define separate areas in a target plane. The side walls of the dividers in conjunction with the interaction region side walls establish the receiving apertures which are entrances to the amplifier output channels. Completing the description of the apparatus, left and right control orifices may extend through the left and right side walls respectively. In the complete unit, the region bounded by top and bottom plates, side walls, the end wall, receiving apertures, dividers, control orifices and a main fluid nozzle, is termed an "interaction chamber region".

Two broad classes of pure fluid amplifiers are:

(I) Stream interaction or momentum exchange and (II) Boundary Layer Control. Class I amplifiers include devices, in distinction to the devices of Class II, in which there are two or more streams which interact in such a way that one or more of these streams (control streams) deflects another stream (power stream) with little or no interaction between the side walls of the interaction region and the streams themselves. Power stream deflection in such a unit is continuously variable in accordance with control signal amplitude. Such a unit is referred to as a continuously variable amplifier or computer element. In an amplifier or computer element of this type, the detailed contours of the side walls of the interaction chamber are of secondary importance to the interacting forces between the streams themselves. Although the side walls of such units can be used to contain fluid in the interacting chamber, and thus make it possible to have the control and power streams interact in a region at some desired ambient pressure, the side walls are so placed that they are somewhat remote from the high velocity portions of the interacting streams and the power stream does not approach or attach to the side walls. Under these conditions the power stream flow pattern within the interacting chamber depends primarily upon the size, speed and direction of the power stream and control streams and upon the density, viscosity, compressibility and other properties of the fluids in these streams.

(II) The present invention relates to the second broad class of fluid amplifier and computer elements; i.e., boundary layer control units. The second broad class of fluid amplifier and computer elements comprises units in which the main power stream flow and the surrounding fluid interact in such a way with the interaction region side walls that the resulting flow patterns and pressure distributions within the interaction region are greatly affected by the details of the design of the chamber walls. In this broad class of units, the power stream may approach or may contact the interaction region side walls. The effect of the side wall configuration on the flow patterns and pressure distribution, which can be achieved with single or multiple streams, depends upon the relation between: the width of the interacting chamber near the power nozzle, the width of the power nozzle, the position of the center line of the power nozzle relative to the side walls (symmetrical or asymmetrical), the angles that the side walls make with respect to the center line of the power nozzle; the length of the side walls or their effective length as established by the spacing between the power nozzle exit and the flow dividers, side wall contour and slope distribution; and the density, viscosity, compressibility and uniformity of the fluids used in the interaction region. It also depends on the aspect ratio and therefore to some extent on the thickness of the amplifying or computing element in the case of two-dimensional units. The interrelationship between the above parameters is quite complex and is described subsequently. Response time characteristics are a function of size of the units in the case of similar units.

Amplifying and computing devices of this second broad category which utilize boundary layer effects; i.e., effects which depend upon details of side wall configuration and placement, can be further subdivided into three sub-types:

(a) Boundary layer elements in which there is no on" effect.

(b) Boundary layer units in which "lock on" effects are appreciable.

(c) Boundary layer units in which "lock on" effects are dominant and which have memory.

(a) Boundary layer elements in which there is no "lock on" effect. Such a unit has a gain as a result of boundary layer effects. However, these effects do not dominate the control signal but instead combine with the control flows to provide a continuously variable output signal responsive to control signal amplitude. In these units the power stream remains diverted from its initial direction only if there is a continuing flow out of or into one or more of the control orifices.

(b) Boundary layer units in which "lock on" effects are appreciable. In these units, the boundary layer effects are sufficient to maintain the power stream in a particular deflected flow pattern through the action of the pressure distribution arising from asymmetrical boundary layer effects and require no additional streams, other than the power stream to maintain that flow pattern. Naturally in this type unit continuous application of a control signal can also be used to maintain a power stream flow pattern. Such flow patterns can be changed to a new stable flow pattern, however, either by supplying or removing fluid through one or more of the control orifices, or through a control signal introduced by altering the pressures at one or more of the output apertures, as for example by blocking of the output channel to which flow has been directed.

(c) Boundary layer control units which have "memory"; i.e., wherein lock-on characteristics dominate control signals resulting from complete blockage of the outlet to which flow has been commanded.

In "memory" type boundary layer units, the flow pattern can be maintained through the action of the power stream alone without the use of any other stream or continuous application of a control signal. In these units, the flow pattern can be modified by supplying or removing fluid through one or more of the appropriate control orifices. However, certain parts of the power stream flow pattern, including "lock-on" to a given side wall, are maintained even though the pressure distribution in the output channel to which flow is being delivered is modified, even to the extent of completely blocking this output channel.

The power stream deflection phenomena in boundary layer units is the result of a transverse pressure gradient due to a difference in the effective pressures which exist between the power stream and the opposite interaction region side walls; hence, the term Boundary Layer Control. In order to explain this effect, assume initially that the fluid stream is issuing from the main nozzle and is directed toward the apex of a centrally located divider. The fluid issuing from the nozzle, in passing through the chamber, entrains some of the surrounding fluid in the the adjacent interaction regions and removes this fluid therefrom. If the fluid stream is slightly closer to, for instance, the left side wall than the right side wall, it is more effective in removing the fluid in the interaction region between the stream and the left wall than it is in removing fluid between the stream and the right wall since the former region is smaller. Therefore, the pressure in the left interaction region between the left side wall and power stream is lower than the pressure in the right interaction region and a differential pressure is set up across the power jet tending to deflect it towards the left side wall. As the stream is deflected further toward the left side wall, it becomes even more efficient in entraining fluid from the left interaction region and the effective pressure in this region is further reduced. In those units which exhibit "lock-on" features or characteristics, this feedback-type action is self-reinforcing and results in the fluid power stream being deflected toward the left wall and predominantly entering the left receiving aperture and outlet channel. The stream attaches to and is then directly deflected by the left side wall as the power stream effectively intersects the left side wall at a predetermined distance downstream from the outlet of the main orifice; this location being normally referred to as the "attachment location". This phenomena is referred to as boundary layer lock-on. The operation of this type of apparatus may be completely symmetrical in that if the stream had initially been slightly deflected toward the right side wall rather than the left side wall, boundary layer lock-on would have occurred against the right side wall.

Control of these units can be effected by controlled flow of fluid into the boundary layer region from control orifices at such a rate that the pressure in the associated boundary layer region becomes greater than the pressure in the opposing boundary layer region located on the opposite side of the power stream and the stream is switched towards this opposite side of the unit.

Alternatively instead of having flow into the boundary layer region to control the unit, fluid may be withdrawn from this "opposite" control orifice to effect a similar control by lowering the pressure on this "opposite" side of the stream instead of raising the pressure on the first side. The control flow may be at such a rate and volume as to deflect the power stream partially by momentum interchange so that a combination of the two effects may be employed. However, it is not essential, and in many cases is undesirable, that the control flow have a momentum component transverse to the power stream when the control fluid issues from its control orifice.

Only a small amount of energy is required in the control signal fluid flow to alter the power jet path so that some or all of the power jet becomes intercepted by the load device or output passage. For a continuously applied control signal, the power gain of this system can be considered equal to the ratio of the "change of power delivered by the amplifier to its output channel or load" to the "change of control signal power" required to effect this associated "change of power" delivered to the output channel or load.

Similarly, the pressure gain can be considered equal to ratio of the "change of output pressure" to the "change of control pressure" required to cause the change, or, the ratio of the "change of output channel mass flow rate to the associate change of control signal mass flow rate" required defines the mass flow rate gain.

It is apparent that this second broad class of pure fluid amplifiers and components and systems provide units which can be interconnected with other units (for example, either Class I or II elements) so that the output signal of one unit can provide the control or power jet supply of a second unit.

The term "input signal" is defined as the fluid signal which is intentionally supplied to the fluid logic component for the purpose of instructing or commanding the component to provide a desired output signal. Preferably each input signal is of some pre-established relatively constant magnitude. The term "output signal" used herein is the fluid signal which is produced by the fluid logic component. The input and output signals can be in the form of time or spatial variations in pressure, density, flow velocity, mass flow rate, fluid composition, transport properties, or other thermodynamic properties of the input fluid individually or in combination thereof. The term "fluid" as used herein includes compressible as well as incompressible fluids, fluid mixtures and fluid combinations.

In general, fluid logic components are designed such that upon the receipt of appropriate combinations of input signals the state of the component changes from a "zero" state to a "one" state. The basic pure fluid logic components of which we are aware incorporate an interaction chamber, a pair of output passages for receiving flow from the chamber and at least two angularly disposed nozzles for issuing interacting fluid streams into the up-stream end of the chamber. The two nozzles can be regarded as the control and power nozzles, respectively, and the input signal is normally supplied to the control nozzle so that a relatively small magnitude input signal can effect amplified directional displacement of the planar power jet flowing from one end of the interaction chamber. One output passage, say, the left output passage, corresponds to the zero state of the component and the right output passage corresponds to the one state of the logic component, and the component undergoes a change of state whenever the output flow switches from the left passage to the right passage. During the absence of a control input signal, it is essential that the component be in the zero state and accordingly issue substantially all flow from the left passage. In addition, once the flow is displaced into the right passage by an input signal, some means must be provided to return the flow to the left passage whenever the input signal is no longer received. The methods by which the power jet is normally directed to the left output passage and returned to the left output passage upon termination of the input signal may include the following: asymmetrically positioning the flow splitter closer to the right side wall than the left side wall with respect to the orifice of the power nozzle and providing sufficient chamber wall setback from the power nozzle orifice so that boundary layer effects are non-existent; positioning the chamber side wall associated with the left passage closer to the power nozzle orifice than the side wall associated with the right passage so that the power jet tends to reattach itself to the former side wall whenever there is an absence of control flow, or more particularly, employing a unit one half of which is a Class I amplifier and the other half of which is a Class II amplifier; inclining the power nozzle towards the left output passage so that the power stream is directed into that passage in the absence of control input flow, using a fluid reset signal to return the stream to the left output passage whenever the aforesaid input signal is terminated, the stream being retained in the reset position by any of the above means; or combinations of these expedients.

The last-mentioned expedient is considered by those skilled in the art to be the most effective way of achieving positive reset since the power stream could be driven back into the left output passage upon termination of the input signal. Those skilled in the art will be aware of the fact that in general power stream flow can be displaced between two output passages by jets issuing from opposed control nozzles, the control nozzles receiving fluid from feedback passages communicating with the output passages. For example, U.S. Patents Nos. 3,016,066 and 3,024,805 disclose such a possibility. However, feedback loops because of their length and the resistance they offer to fluid flow increase the response time of the amplifying system. Whereas in many instances the increase in amplifier response time caused by feedback is innocuous, in fluid logic components the increase in response time produced by feedback passages is a severe limitation on the component and one which should be obviated.

The present invention provides a solution to the dual problems of excessive response times and positive reset action in pure fluid amplifying systems in general, and in pure fluid logic components in particular. In addition, positive reset of the fluid components is achieved by this invention without the use of a reset control nozzle or a lengthy feedback loop.

Briefly, according to a preferred embodiment of this invention, one side wall; the right side wall being chosen for purposes of example only, of the interaction chamber is set back a substantial distance from the power stream so as to prevent lock-on to this wall while the other (left) side wall is placed close to the power stream so that the stream normally attaches to the left side wall. Therefore the device comprises one-half of a Class I element and one-half of a Class II element so that upon initiation of the stream, it attaches to the left side wall and exits through the left output passage; this being designated as the zero state. Upon application of one or more input signals flows to the left side of the power stream, the power stream is deflected to the right and will return to the left side upon termination of the stream. In order to stabilize the position of the stream when deflected to the right and to decrease the time required for the stream to return to the left side of the unit after termination of the input signal or signals, the unit is provided with a concave projecting element located proximate the entrance of the right output passage for intercepting and scooping off a portion of the flow into the right output passage and directing this flow against the right side of the stream to interact with and drive the flow into the left output passage whenever the input signal producing deflection to the right output passage terminates.

As indicated above, the concave projecting element in the right side wall also serves to stabilize the position of the power stream relative to the flow divider and right output passage. If the device is an "or" unit the deflection of the stream to the right is greater when two input signals are applied than when one is applied. In the former case, however, a greater portion of fluid is initially scooped off by the concave projected element (cusp) and directed against the side of the stream. The stream then shifts to the left and stabilizes in the correct position relative to the output passage.

Broadly, therefore, it is an object of this invention to provide a pure fluid logic component that is automatically stabilized and subsequently reset by a negative feedback fluid flow created in the component.

Another object of this invention is to provide a pure fluid logic component for performing prescribed logic functions with fluid streams, the component having a power gain and the capability of generating a feedback flow that resets the component whenever fluid logic input signals are not supplied to the component.

Another object of this invention is to provide an interaction chamber for use in a pure fluid logic component, the interaction chamber being designed to generate a feedback flow from a portion of the fluid logic input signals received by the chamber, the feedback flow effecting stabilization of the position of the stream during presence of input signals and reset of the stream upon termination of a predetermined number of logic input signals, the number being determined by design of the element to effect "and" or "or" functions.

Figure 2:
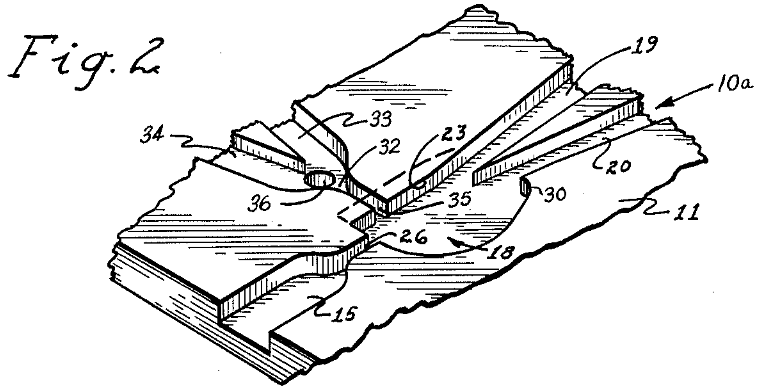

The above and still further objects, features and advantages of the present invention will become apparent upon consideration of the following detailed description of several specific embodiments thereof, especially when taken in conjunction with the accompanying drawings, wherein:

FIGURE 1 illustrates a plan view of one embodiment of a logic component in accordance with this invention; and FIGURE 2 illustrates a plan view of another embodiment of a fluid logic component in accordance with this invention.

Referring now to FIGURE 1 of the accompanying drawings for a more complete understanding of the invention, there is illustrated a fluid logic component 10 which is formed in a flat plate 11 by molding, casting, etching or other conventional cavity and passage forming techniques. The plate 11 is covered by a flat plate 13, the plates 11 and 13 being secured one to the other by machine screws, clamps or adhesives. For purposes of more clearly illustrating the invention, the plates 11 and 13 are shown composed of a clear plastic material or glass although it should be understood that the plates may be composed of any material that is compatible with the fluid or fluids employed.

The plate 11 is cut, molded or otherwise formed in the configuration shown in FIGURE 1 in order to provide three nozzles 15, 16 and 17, a jet interaction chamber 18 and left and right output passages 19 and 20 which may also be regarded as the 0 value output passage and the 1 value output passage, respectively. The diverging sides of a flow splitter 21 define adjacent sides of the output passages 19 and 20. The nozzle 15 may be regarded as a power nozzle for receiving a fluid input under some relatively constant pressure, and the nozzles 16 and 17 can be regarded as input nozzles which receive fluid input signals variable between two distinct pressure levels, one of which is preferably at a 0 pressure level if the component is a closed system or at an ambient pressure level if the component is an open system; that is, open to atmospheric pressure.

The chamber 18 is formed with a pair of side walls 22 and 23, a flat bottom wall 24, an end wall 25, and the flat covering surface of the plate 13. The side wall 22 is preferably set back at a position sufficiently remote from an orifice 26 formed in the end wall 25 by the nozzle 15 that no boundary layer effects are developed between the side wall 22 and a stream issuing from the orifice 26. The side wall 23 is positioned sufficiently close to the orifice 26 that boundary layer effects are developed between the jet or stream of fluid issuing from the nozzle 15 and the side wall 23. A section of the side wall 22 and a short section of side wall 28 at the entrance to the passage 20 intersect to form a cusp 30; the cusp 30 being positioned to divert or scoop off fringe portions of the combined control and power streams entering the passage 20. The portion of the stream scooped off by the cusp 30 is directed in a substantially circular path as indicated by the arrow 31 by the arcuate or concave section of the sidewall 22 and feeds back into interacting relationship with the flow entering the output passage 20. The proportion of fluid diverted to the concave section of the wall 22 by the cusp 30 and fed back against the flow is governed by the width of the entrance of the passage 20, the width of the planar flow entering the passage 20 and the position of the stream.

As shown in FIGURE 1, the orifice 26 formed in the end wall 25 may be asymmetrically disposed with respect to the side walls 22 and 23 and positioned close enough to the side wall 23 so that in the absence of a fluid logic signal from the nozzle 16 or 17, the power jet will attach itself to the wall 23 and issue from the 0 value output passage 19. This effect is further enhanced by location of the side wall 23 which favors boundary layer lock-on to this wall. In accordance with conventional digital designations the component 10 may be considered to be in the 0 state when all or substantially all flow issues from the passage 19 since the 0 state is representative of a condition where neither the nozzle 16 nor the nozzle 17 is receiving an input fluid signal which would issue as a control stream from either nozzle. In the event either the nozzle 16 or the nozzle 17 receives a fluid logic input signal the stream issuing from that nozzle will overcome boundary layer effects between the side wall 23 and the power jet and deflect the power jet from the wall 23 and into the passage 20. The component 10 will then be in the 1 state.

As flow enters the passage 20, a fringe portion of the flow is intercepted and fed back against the main portion of the flow with a momentum great enough to deflect the main portion of flow from the passage 20 towards the side wall 23 in the absence of continued deflection by fluid from either the nozzle 16 or 17. Since the side wall 22 is remote from the orifice 26 the deflected flow will not attach itself to the side wall 22 and therefore when input signals are not received by either the nozzle 16 or the nozzle 17 the flow will be deflected sufficiently close to the side wall 23 to permit a boundary layer to be created between the flow and the side wall 23. The power jet thereby reattaches itself to the side wall 23 and issues from the output passage 19. The flow at the time of initial reattachment may comprise the power jet and residual quantities of the control input fluid entrained in the power jet and deriving from the concave feedback portion in the right wall.

Deflection of the flow entering the passage 20 by the feedback fluid is primarily effected by the momentum of the fluid directed essentially transversely against the stream flowing in the chamber 18. Since the nozzles 16 and 17 terminate in orifices adjacent the orifice 26 of the nozzle 15 and since the power jet is substantially constricted as it crosses the orifices of the nozzles 16 and 17 the power jet displacement capability embodied in the fluid issuing from either the nozzle 16 or the nozzle 17 is considerably greater than the deflecting effect produced by the feedback stream. Thus, the component 10 can be designed such that even though the magnitude of the input signal supplied to the nozzle 16 or 17 is relatively small it will maintain the power jet deflected into the passage 20 while the feedback stream is interacting with the major portion of the flow entering the passage 20.

It will be evident that the negative feedback flow, the asymmetry of the divider, and the boundary layer effects cooperate to render the component 10 monostable, the component 10 switching from the 0 to the 1 state if either the control nozzle 16 or the control nozzle 17 receives an input signal, and remaining in the 0 state if neither the control nozzle 16 nor the control nozzle 17 receives an input signal. Therefore the component 10 provides an or-nor logic function.

As previously indicated the feedback loop as tends to stabilize the position of the power stream in the 1 position so that the pressure recovery of the device remains substantially constant regardless of which or how many of the input nozzles is or are issuing fluid. It is apparent that if both input nozzles 16 and 17 are issuing fluid, the initial deflection of the power stream is greater than if only one input nozzle issues fluid; deflection being proportional to momentum interchange effect. However, in the former case, more fluid is intercepted by the cusp 30 so that the stream is redirected toward the left until a balance or equilibrium condition (position) is reached, which position is very close to that when only a single input nozzle supplies flow. Thus, pressure recovery of the system is essentially stabilized.

Stream stabilization is also desirable to correct differences in stream position as between control by the nozzles 16 and 17. Since the nozzle 16 is closer to the power nozzle 15, flow therefrom is more effective in deflecting the power stream than flow from the nozzle 17. Here again the feedback stabilizes the final position of the power stream so that it has substantially the same position regardless of the nozzle issuing fluid.

The unit of FIGURE 1 has thus far been described as an "or-nor" unit. However, it may also be employed as an "and" unit. The position of the divider and the left side wall determine the momentum of the control streams required to displace the power stream to the right. If the left side wall is moved quite close to the outlet orifice of the power nozzle 15 and/or the divider is moved towards the right, the flow provided by the control nozzles individually can be made insufficient to deflect the power stream to the right. The pressure of the power stream is also a factor in determining the response of the device since the higher the pressures of the supply to the power nozzle the higher the speed of fluid flow and the momentum required to deflect the stream is increased. Also, the higher the stream speed the greater is its ability to entrain fluid so that the pressure on the left side of the stream may be made quite low. If the entrainment area is small (little set back of the left wall) the unit may be made highly resistant to switching of the main stream. In these ways the unit of FIGURE 1 may be made to require flow from both input nozzles 16 and 17 before it switches to the right side and therefore operate as an "and" unit.

Although two control nozzles 16 and 17 are shown in FIGURE 1, it should be evident that the number of nozzles used is variable and will ordinarily be a matter of choice governed primarily by the number of "or" logic functions to be performed by the component 10. Also, more than one power nozzle may be provided to discharge fluid through the end wall 25 of the chamber 18. The component 10 has been hereinabove described as a one half Class I and one half Class II type of beam deflection fluid amplifier; however, the side wall 23 may be located remote from the orifice 26 as indicated by the dotted lines in FIGURE 1, to provide solely Class I type of amplifier operation. The orifice 26 in this case would be positioned to direct flow into the passage 19 in the absence of deflecting flow from the control nozzles.

A further advantage of the apparatus of the invention is that amplification of the input signal is inherent. In all cases, the pressure, energy or quantity of fluid switched is greater than the corresponding parameter of the input signal, so that the logic element is also an amplifier. Thus, the logic and amplification functions are combined in a single element.

FIGURE 2 of the drawings illustrates another embodiment of a fluid logic component generally designated by the numeral 10*a*. In this embodiment, a common terminal for the input signals is provided by a nozzle 32 which receives input flow from a pair of passages 33 and 34. The cover plate 13 is shown removed from the plate 11 for purposes of clarity. The nozzle 32 combines the fluid input signals from the passages 33 and 34 into a single defined fluid stream which issues from an orifice 35 formed in the side wall 23 of the chamber 18.

An orifice 36 extends prependicularly through the plate 11, and a portion of the input fluid can egress from the nozzle 27 through this orifice. By definition, since each fluid input signal supplied to the input passages 33 and 31 is of a certain substantially constant magnitude, the radius of the orifice 36, the size of the orifice 35, the passages 33 and 34, the size of the nozzle 32 can be proportioned relative to each other such that a fluid control jet of sufficient magnitude to displace the power stream from the passage 19 to the passage 20 only egresses from the orifice 35 when input signals are received by both passages 33 and 34. If only one of the passages 33 or 34 receives a fluid signal, the size of the orifice 36 should be made large enough so that all, or substantially all, of this input egresses from the nozzle 32 through the orifice 36, and consequently insufficient flow issues from the orifice 35 to change the state of the component 10*a* from the 0 to the 1 state by displacement of the power jet from the passage 19 to the passage 20. Thus, the component 10*a* changes state only when the passage 33 and the passage 34 receives fluid input signals substantially simultaneously. The side wall 23 may be set back remote from the orifice 26 as indicated by the dotted line, and the power jet directed into the passage 19 if Class I type of operation is desired; the component 10 illustrated by the solid lines in FIGURE 2 being basically one half of a Class I and one half of a Class II type of fluid amplifier since only the side wall 23 is positioned close enough to the orifice 26 to permit the creation of boundary layer effects between that wall and the power jet issuing from the orifice 26.

Automatic reset is provided in the component 10*a* for the same reasons discussed hereinabove in relation to the structure and operation of the cusp 30 and the interaction chamber 18 of the component 10.

The component 10*a* may be converted into an "or-nor" logic component by the addition of another control nozzle positioned adjacent the nozzle 32 for discharging flow through the chamber wall 23 into interaction with the power stream, or as will be obvious into an OR logic component by eliminating the orifice 36 from the nozzle 32.

With respect to both of the components 10 and 10*a*, the number of control nozzles embodied in either component may be limited in number by the location of the point of stream attachment to the side wall 23. The power jet displacing effectiveness of control flow is greatest between the end wall 25 and the point of attachment on the side wall 23 since a relatively small magnitude input signal can initially nullify the boundary layer effects between the power stream and the side wall 23 within this range and thereafter deflect the power stream through a minimum angle by momentum exchange into the output passage 20. However, downstream of the point of attachment the control stream relies not only upon momentum exchange to deflect the power stream from the passage 19, but in addition, the angle through which the power jet must be deflected becomes greater. Therefore in general, the magnitude of the input signal must be increased to effect power jet displacement when the control nozzle orifices are downstream of the point of attachment over and above that which would be required were the control nozzle orifices located in the side wall 23 upstream of the point of attachment. In some applications, however, it may be desirable to isolate the control nozzles and hence one or more control nozzles may be provided upstream of the point of attachment while one or more control nozzles are positioned downstream of the point of attachment, the control nozzles discharging from the same or opposite chamber sidewalls into the interaction chamber.

While the power jet issuing from the nozzle 15 has been described in both embodiments as being continuous, the power jet flow may be intermittent, the only requirement being that the jets from the nozzles 16 and 17 and the power jet interact at substantially the same time in the chamber 18.

If input signals of relatively low order magnitude are to be received by either or both of the nozzles 16 and 17, the cusp 30 should be positioned relative to the entrance of the passage 19 to intercept less of the displaced flow so that the possibility of the feedback stream overriding the control stream or streams and deflecting the flow into the passage 19 will be reduced.

While we have described and illustrated two specific embodiments of our invention, it will be clear that variations of the details of construction which are specifically illustrated and described may be resorted to without departing from the true spirit and scope of the invention as defined in the appended claims.

We claim:

1. A fluid logic element comprising a fluid interaction chamber for confining fluid flow therein to planar flow, a nozzle for issuing a well-defined stream into one end of said chamber, at least a pair of output passages having the entrances thereof located downstream of said nozzle for receiving the stream therefrom, said entrances defining the other end of said chamber, means for directing the stream into one of said passages, means responsive to an input signal for deflecting the stream from said one passage into the other of said passages, said chamber including means proximate said entrance to said other passage for scooping off a portion of the stream and for feeding back said portion into interaction with one side of the stream, said portion of said stream being insufficient to deflect the stream away from said other passage when the input signal is applied to said means for deflecting and being sufficient to deflect the stream to said one passage in the absence of the input signal.

2. The component as claimed in claim 1, wherein said means for deflecting the stream comprises a second nozzle angularly positioned with respect to the direction of flow and communicating with said chamber for issuing a fluid jet into interacting relationship with the stream.

3. The component as claimed in claim 1, wherein said scooping and feeding means comprises an arcuate projection formed by said chamber proximate the entrance of said other passage for scooping off and feeding back a portion of the stream.

4. The component as claimed in claim 1 wherein said nozzle communicates with said one end of said chamber through an orifice and wherein said means for normally directing the stream into one of said passages comprises a chamber side wall positioned sufficiently proximate said orifice from whence the stream issues so that the stream attaches itself to said sidewall and issues into said one passage whenever said input signal is absent.

5. An AND fluid logic component comprising a chamber for receiving and confining fluid flow to one plane, said chamber including a pair of side walls, first nozzle for issuing a fluid stream into one end of said chamber between said side walls, a pair of output passages located downstream of said first nozzle for receiving flow from said chamber, plural input passages for receiving input fluid signals of substantially predetermined magnitudes, a second nozzle for combining and constricting the fluid input signals from said input passages to a defined fluid jet, means for directing the stream into one of said output passages in the absence of control jet flow of some predetermined minimum magnitude, one of said side walls having an orifice formed therein through which the jet issues in interacting relationship with the stream so as to displace the stream from said one to the other of said output passages, said second nozzle having an egress opening communicating therewith, the size of the opening being such that only fluid input signals in at least two input passages provide a jet of at least said predetermined minimum magnitude for effecting amplified directional displacement of the stream into said other output passage.

6. The AND logic component as claimed in claim 5, wherein means are provided in said chamber for displacing the stream into said one output passage whenever the magnitude of said control jet is less than said predetermined minimum magnitude.

7. The logic component as claimed in claim 6 wherein the stream displacing means comprises a concave portion of chamber side wall located proximate the entrance to said other output passage and positioned to intercept and feed back a portion of the stream into interaction therewith so that the stream tends to be displaced towards said one output passage by the portion fed back.

8. A fluid logic component comprising a chamber for receiving and confining fluid flow in one plane, a nozzle for issuing a defined fluid stream into one end of said chamber, plural output passages having the entrances thereof located downstream of said nozzle for receiving planar flow from said chamber, said entrances defining the other end of said chamber, plural nozzles for receiving plural input fluid signals, said plural nozzles being angularly positioned with respect to said nozzle for converting the fluid signals into fluid jets and for issuing the jets in interacting relationship with the fluid stream, the stream being directed into one of said output passages in the absence of interacting jet flow of at least some predetermined minimum magnitude, jet flow from at least one of said plural nozzles of said predetermined magnitude causing amplified directional displacement of the stream from said one output passage to another output passage, said chamber including feedback means located proximate the entrance of said another output passage for deflecting a portion of the stream against said stream, said feedback means deflecting a portion of said stream insufficient to reduce substantially the flow to said another output passage in the presence of an interacting jet of said predetermined minimum magnitude and sufficient to deflect said stream to said one output passage upon termination of said interacting jet of said predetermined minimum magnitude.

9. A fluid component comprising an interaction chamber for confining fluid flow therein to one plane, said chamber being formed with an end wall and pair of side walls, a first nozzle communicating with an orifice formed in said end wall for issuing a defined stream into said chamber, a pair of passages having the entrances thereof located downstream of the orifice for receiving fluid from said chamber, one of said side walls positioned sufficiently close to the orifice so that the stream attaches itself to the one side wall and issues from one of said output passages, the other of said side walls positioned remote from the orifice so that no attachment occurs between the other side wall and the stream as the stream issues from the other of said passages, a second nozzle angularly positioned with respect to said first nozzle and extending through said one side wall for issuing a jet into interacting relationship with the stream for displacing the stream from said one passage to said other passage, a cusp formed by a concave section of said other side wall and a section of the entrance to said other passage, said cusp intercepting and feeding back a portion of the stream, when said stream is deflected to said other passage, insufficient to divert any of the stream into said one passage in the presence of a jet issuing from said second nozzle and sufficient to deflect substantially all of the stream to said one passage upon termination of said jet.

10. A fluid component comprising a fluid interaction chamber for confining fluid flow having at least one end wall and a pair of sidewalls, an orifice in said end wall for issuing a defined power stream, at least a pair of output passages at the other end of said chamber and with the entrances located downstream of and directed toward said orifice for receiving said stream therefrom, and means located along one sidewall to develop a control signal for deflecting substantially all of the stream from one position with respect to said passages to another position in response to a signal, the other of said sidewalls being remote from said stream so as to prevent boundary layer effects, said chamber including means adjacent said other sidewall for scooping off a portion of said stream when in said other position and feeding back said portion against said stream to deflect said stream to said one position from said other position only upon termination of said signal, said portion being insufficient to alter flow of said stream to said one position in the presence of the control signal.

11. The fluid component as defined in claim 10, wherein said scooping and feeding means is an arcuate portion of said other sidewall.

12. The fluid component as defined in claim 10, wherein said entrances of said output passages that receive said stream define the other end of said chamber.

13. The fluid component as defined in claim 10, wherein said deflecting means is a control nozzle located along said one sidewall with said other sidewall being an arcuate recess away from said stream to prevent boundary layer lock-on effects, said scooping and feeding means comprising an arcuate extension portion of said other sidewall.

14. An AND fluid logic component comprising a chamber for confining fluid flow, first nozzle means for issuing a fluid stream into one end of said chamber, a pair of output passages at the other end of said chamber located downstream of said first nozzle for receiving said stream, plural input passages for receiving input fluid signals of substantially predetermined magnitudes, a second nozzle disposed at an angle to said first nozzle for combining and constructing the fluid input signals from said input passages and for issuing a defined fluid jet for deflecting said stream, said second nozzle having an egress opening communicating therewith, the side of the opening being such that only said fluid input signals in at least two input passages provide a jet of sufficient magnitude from said nozzle to deflect said stream from one position with respect to said passages to another position.

15. A fluid component comprising a fluid interaction chamber for confining fluid flow having at least one end wall and a pair of sidewalls, an orifice in said end wall for issuing a defined power stream, at least a pair of output passages at the other end of said chamber and with the entrances located downstream of and directed toward said orifice for receiving said stream therefrom, and means located along one sidewall to develop a control signal for deflecting the stream from one position with respect to said passages to another position in response to a signal, the other of said sidewalls being remote from said stream so as to prevent boundary layer effects, said chamber including means adjacent said other sidewall for scooping off a portion of said stream when in said other position and feeding back said portion against said stream, said portion of said stream being insufficient to deflect said power stream to said one wall in the presence of said control signal and being sufficient to increase the rate at which said power stream is deflected to said one wall upon termination of said control signal.

References Cited by the Examiner

UNITED STATES PATENTS

| | | | |
|---|---|---|---|
| 3,001,539 | 9/1961 | Hurvitz | 137—83 |
| 3,093,306 | 6/1963 | Warren | 235—61 |
| 3,107,850 | 10/1963 | Warren et al. | 235—61 |
| 3,128,040 | 4/1964 | Norwood | 235—201 |
| 3,158,166 | 11/1964 | Warren | 137—81.5 |

OTHER REFERENCES

Control Engineering, February 1961 (page 145 relied on; copy in Group 430, 235-61FS, and in Scientific Library).

M. CARY NELSON, *Primary Examiner.*

LAVERNE D. GEIGER, *Examiner.*